United States Patent [19]

Hunt

[11] 4,140,490
[45] Feb. 20, 1979

[54] CARBON BLACK PRODUCING APPARATUS

[75] Inventor: Harold R. Hunt, Bartlesville, Okla.

[73] Assignee: Phillips Petroleum Company, Bartlesville, Okla.

[21] Appl. No.: 843,779

[22] Filed: Oct. 20, 1977

Related U.S. Application Data

[62] Division of Ser. No. 704,588, Jul. 12, 1976, Pat. No. 4,069,298.

[51] Int. Cl.² ............................................. C01B 31/02
[52] U.S. Cl. ..................................... 422/151; 422/156
[58] Field of Search ............... 23/259.5; 423/450, 455, 423/456, 457, 458

[56] References Cited

U.S. PATENT DOCUMENTS

| | | | |
|---|---|---|---|
| 3,222,136 | 12/1965 | Hess et al. | 23/259.5 |
| 3,369,870 | 2/1968 | Ganz et al. | 23/259.5 X |
| 3,642,446 | 2/1972 | Heller et al. | 423/455 |
| 3,984,528 | 10/1976 | Cheng et al. | 423/450 |

Primary Examiner—Morris O. Wolk
Assistant Examiner—Roger F. Phillips

[57] ABSTRACT

A carbon black producing apparatus in which a quench fluid is introduced into a reaction zone for cooling hot smoke which contains solid carbon black particles which are produced by the pyrolysis of a carbon black make hydrocarbon by the heating of same with a combusted air/fuel mixture. The quench fluid is introduced into the reaction zone in a generally tangential direction and in a direction counterrotational to the direction of the vortex flow of the hot smoke flowing along the length of the reaction zone. The cooled smoke is passed to a heat exchanger for further cooling of the smoke after which the smoke is separated into an off-gas phase and a carbon black particle phase by filtering means. The carbon black can then be pelleted and dried for use.

8 Claims, 4 Drawing Figures

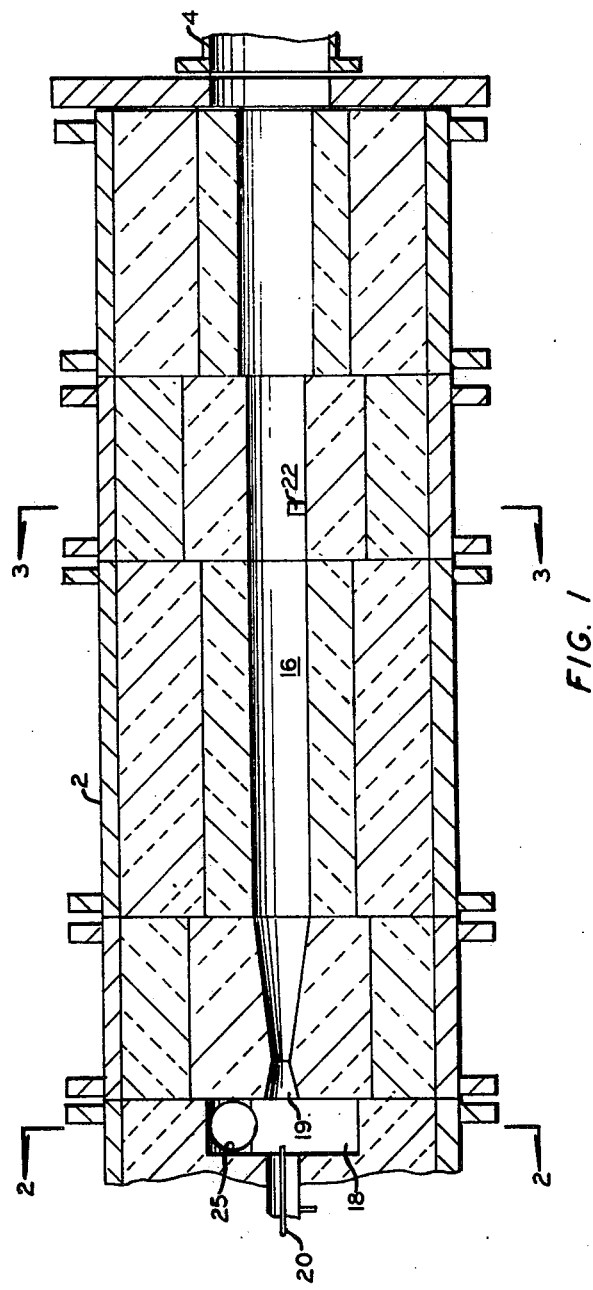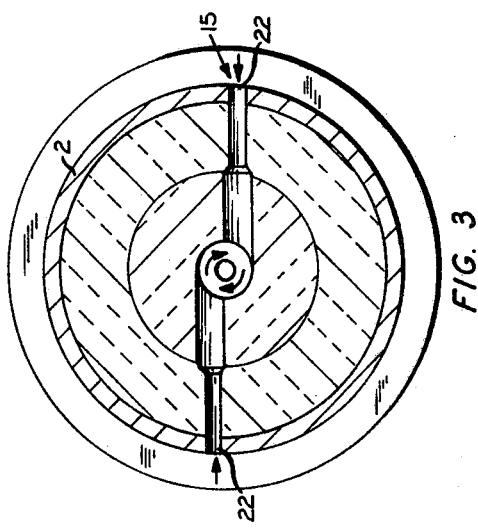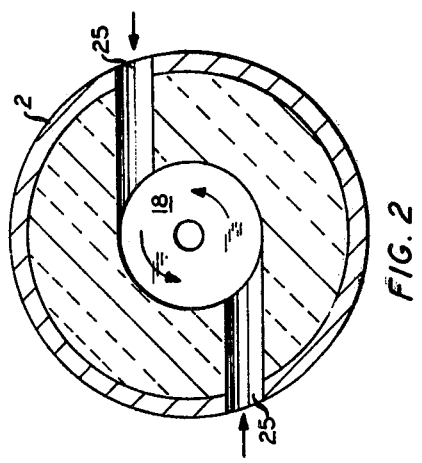

CARBON BLACK PRODUCING APPARATUS

This is a division of application Ser. No. 704,588, filed July 12, 1976, now U.S. Pat. No. 4,069,298.

The present invention relates to a method and apparatus for producing carbon black, and more particularly, to a method of quenching hot smoke in the reaction zone to stop the change in photelometer of the carbon black at a predetermined value. Many methods are known for quenching, i.e., cooling, the hot smoke produced in the carbon black producing processes wherein photelometer is a property effective for determining the effectiveness of the quench. One quench method well known in the art is to contact the hot smoke with a quench fluid such as water which then produces water vapor requiring larger bag filter facilities becasue of the increased amount of vapor or gas which the filter system must handle to separate the off-gas from the solid carbon black particles. This is disadvantageous because of the expense of the filtering system. Another method, as is disclosed in U.S. Pat. No. 3,369,870, is to separate a portion of the smoke after cooling of same and return same to the reaction zone in a cooled condition and introduce same thereinto in corotational flow to the vortex flow of the smoke as the smoke flows along the length of the reaction zone for contact with the hot smoke for quenching thereof. It has been found that introducing the quench fluid into the reaction zone in a direction generally counterrotational to the vortex flow of the smoke as same flows along the length of the reaction zone provides improved results over the processes known in the art whereby less quench fluid is needed to effect the same quenching as compared with corotational introduction.

The principal objects and advantages of the present invention are: to provide a method and apparatus for producing carbon black which provides improved operating results in the quenching of hot smoke in the reaction zone; to provide such a method which is simple to perform, requiring minimal changes in the structure of existing carbon black reactors; to provide such a method which provides better control of the carbon black producing process by controlling the final product properties more accurately; to provide such a process which uses less quench fluid to accomplish the desired results, thereby decreasing the volume of gas charged to the filters; and to provide such a method and apparatus which is well adapted for its intended use and economical to perform.

Other objects and advantages of the present invention will become apparent from the following description taken in connection with the accompanying drawings wherein are set forth by way of illustration and example certain embodiments of the present invention.

FIG. 1 is a cross-sectional view of a carbon black reactor showing the combustion zone and reaction zone.

FIG. 2 is a sectional view of the reactor taken along the line 2—2, FIG. 1.

FIG. 3 is a sectional view of the reactor taken along the line 3—3, FIG. 1.

Figure 4:
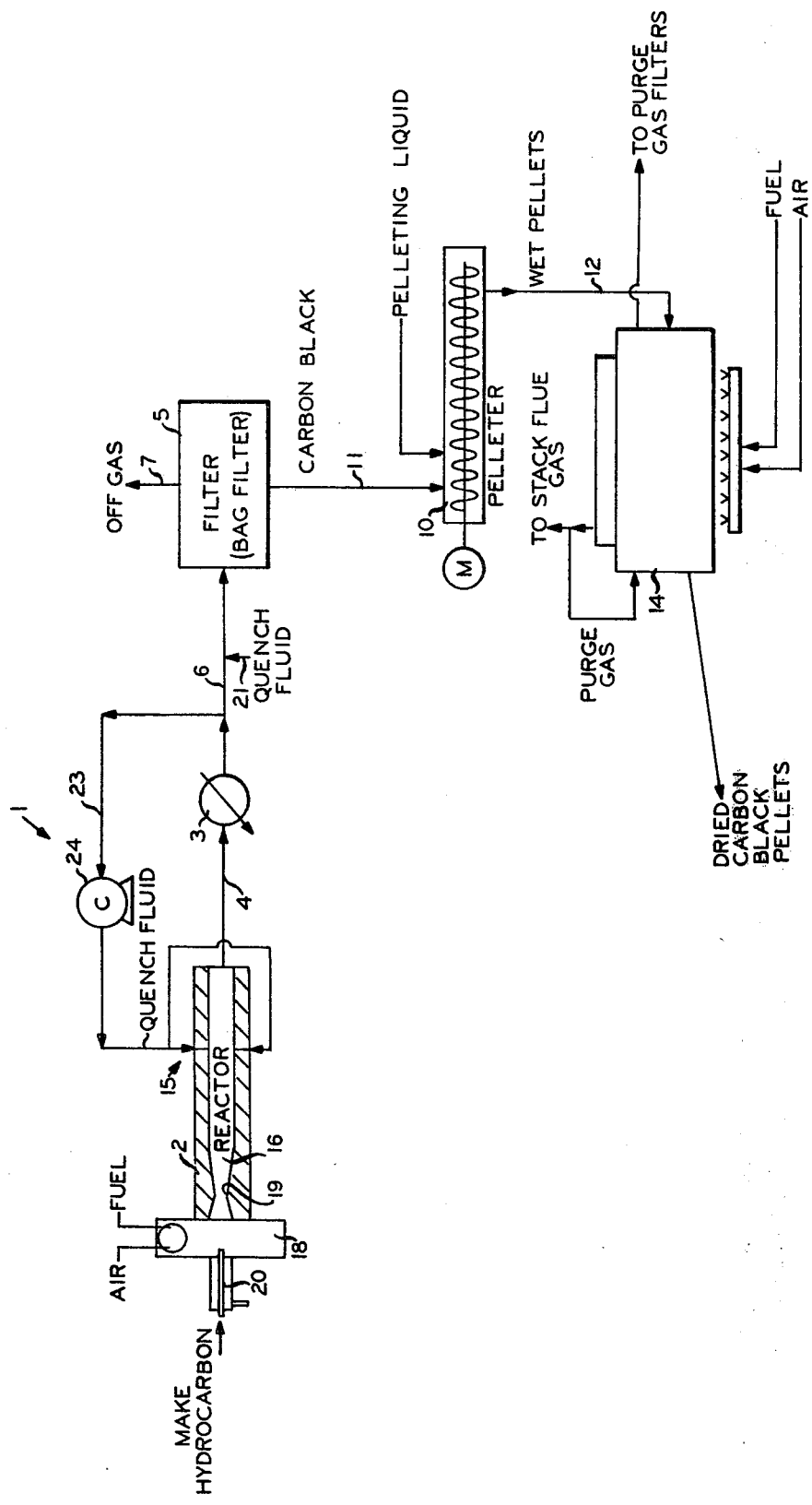
FIG. 4 is a schematic representation of a carbon black producing apparatus.

Referring more in detail to the drawings:

As required, detailed embodiments of the invention are disclosed herein, however it is to be understood that these embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

The reference numeral 1 designates generally an apparatus for producing carbon black and includes a furnace type reactor 2 of the type which is known in the art as is disclosed in U.S. Pat. No. 2,564,700. The reactor 2 has the exhaust thereof connected to cooling means 3 by a conduit 4 with the cooling means 3 being connected to a downstream filter means 5 by a conduit 6 and the filter means is provided with a vent 7 for the release of off-gas which can be used as fuel gas. The filter means 5 is also connected to a downstream pelleter 10 by a conduit 11 through which the recovered carbon black is passed. As shown, pellets which are produced in the pelleter 10 can be conducted via a conduit 12 to a dryer 14 of a type which is well known in the art. Inlet means 15 communicate with the reactor 2 to provide an inlet for introducing a quench fluid into a reaction zone 16 of the reactor 2.

The reactor 2 is generally of a type known in the art and is comprised of a precombustion zone 18 into which air and fuel are introduced for combustion or into which hot combustion gases are charged, with the precombustion zone 18 communicating with the reaction zone 16. Preferably, a venturi 19 is provided in the carbon black forming portion of the reaction zone 16. The reaction zone 16 communicates with the conduit 4 whereby smoke, which contains solid carbon black particles in suspension, is discharged from the reaction zone to the conduit 4. In the type of reactor disclosed, a carbon black make hydrocarbon is pyrolyzed by contact with the hot combustion gases, with the make hydrocarbon being introduced by injection means 20. In the reactor disclosed, the smoke produced by the hot combustion gases and the pyrolyzed hydrocarbon flows in a vortex path along the reaction zone 16 in either clockwise or counterclockwise rotation. The hot smoke contains solid carbon black particles and it is desired to cool the hot smoke to a temperature sufficiently low to stop the carbon black production reaction at a predetermined stage which is measured by the photelometer of the carbon black particles.

The injection means 15 is operable to inject a quench fluid into the reaction zone, preferably at a position downstream of the reactor venturi 19 and as best seen in FIG. 2, the injection means includes a pair of generally opposed passages 22 communicating with the reaction zone and are generally normal to the longitudinal axis of the reaction zone. The passages 22 are directed in a generally tangential direction into the reaction zone. It is to be understood, however, that the use of the word "tangential" includes that portion of the passage which is not truly tangential to the periphery of the reaction zone but is tangential to a point closer to the center of the reaction zone. The discharge opening of the passages 22 into the reaction zone can extend from the center of the reaction zone to a point at the periphery of the reaction zone. The purpose of the passage being positioned in the tangential manner is to effect a rotational introduction of the cooling gas into the reaction zone for vortex flow therein. The passages 22, preferably, face in opposite directions or 180° apart; however, it is to be understood that different relative angular positions of the passages 22 can be used as long as same are directed in a tangential direction into the reaction zone 16.

The cooling means 3 can be of any suitable type and, preferably, are of an indirect heat transfer type wherein process air for use in the reactor 2 and/or make hydrocarbon and/or water can be used as the cooling medium to indirectly cool smoke passing therethrough to the filter means 5. The filter means is preferably of a bag filter type as is known in the art; however it is to be understood that any type of suitable filter or gas-solids separator can be used. The function of the filer is to separate the carbon black particles from the remaining constituent parts of the hot smoke with the carbon black then being conducted to the pelleter 10 which is of a type well known in the art and the remaining constituent parts of the smoke are exhausted through the vent 7, and can be used as fuel gas. Injection means 15 provides a prequench of the hot smoke to stop or retard the carbon black forming process. Further cooling before filtering can be effected by cooling means 3. Any additional final cooling can be effected by injecting water by way of conduit 21 into the smoke in conduit 6 between cooling means 3 and filter 5.

Any suitable cooled fluid can be used as the prequench fluid with such fluids including gases such as nitrogen, but it is preferred that a portion of the smoke, after same is cooled to a temperature of about 500 to 600° F or less, wherein the smoke can be cooled such as by passing through the cooling means 3, and can be recycled to the inlet means 15 via a conduit 23. Preferably, the conduit 23 communicates with the conduit 6 between the water injection means 21 and the cooling means 3. This, in a preferred embodiment, is to prevent excess water vapor from being returned to the reaction zone and introduced thereinto through the inlet means 15. It is to be noted that a compressor or blower 24 can be connected in the conduit 23 to induce the flow of smoke therethrough to the inlet means 15.

The present invention is more fully understood by a description of the operation thereof. In operation, air and a combustible fuel are introduced into the precombustion zone 18 through tangentially directed passages 25 which induces vortex flow with the air and fuel being combusted to form hot combustion gases. Make hydrocarbon is introduced by way of conduit 20 into the reactor 2 and is pyrolyzed by contact with hot combustion gases to produce hot smoke which contains solid carbon black particles with the hot smoke flowing in a vortex path along the reaction zone 16. The prequench fluid is introduced into the reaction zone via the inlet means 15 with the passages 22 being directed in a direction which will induce flow of the quench fluid into the reaction zone in a direction at least, initially, counterrotational to the direction of the vortex flow of the hot smoke in the reaction zone 16. The prequench is added to lower the smoke temperature which is abot 2200° F to 2700° F to a temperature of up to about 1800° F, or preferably up to about 1600° F, to stop the carbon black forming reaction. Further cooling preferably lowers the smoke temperature by the cooling means 3 to about 500° to 600° F. The final water quench brings smoke to about 400–450° F by the use of the water injection means 21. This cooled smoke in the reaction zone, after contact with the cooled prequench fluid is then exhausted from the reaction zone and conducted to the cooling means 3 via the conduit 4 for further cooling. The mixture of smoke and prequench fluid is then further cooled in the cooling means 3 and at the water injection means 21 and is exhausted therefrom via the conduit 6 to the filter means 5 with a portion of the admixture of cooled smoke and prequench fluid being recycled to the reaction zone via the conduit 23.

By way of specific example, the following invention was tested to provide comparative data between introducing the prequench fluid in a counterrotational manner relative to the vortex flow of the hot smoke and corotational introduction of prequench fluid into the reaction zone relative to the vortex flow of the hot smoke in the reaction zone. In this test, two runs were made wherein both runs made substantially the same carbon black by charging the same qualities and quantities of make hydrocarbon, air, and fuel gas. In order to establish a base figure in photelometer in order to compare data obtained from the invention, an excess water quench was used to insure complete quench at a 65-inch locus with no prequench, i.e., no quench fluid was injected via the inlet means 15 into the reaction zone. The location of the introduction of excess water into the reaction zone is measured from downstream end 24 of the precombustion zone. The following distances were all measured from the downstream face of the precombustion zone. A photelometer reading in two tests were 83 and 89, indicating that the carbon blacks produced were dry and not oily at this locus. After these base figures were obtained, another experimental run was conducted wherein water was introduced into the reaction zone, at a locus of 39½-inches, for prequenching with the water being introduced contrarotational to the vortex flow of the hot smoke. The carbon black produced by this run which by using water as a prequench fluid assured complete quench and produced a photelometer reading of 47, meaning that the carbon black was oilier than that obtained in the run above to establish the base figure. This was also again repeated except using nitrogen as the prequench fluid wherein a photelometer reading of 48 was obtained at this location wherein it was determined that the photelometer of the carbon black in the hot smoke at this location was 48 or oily. Therefore, from the base runs and from the two previously described runs, it can be concluded that the photelometer of the carbon black changes from 48, oily, to 83, dry, while traveling from the 39½-inch locus to the 65-inch locus. With no prequench at the 39½-inch locus, the temperature of the reaction zone was above 1600° F which is sufficiently high to cause increase in the photelometer value of 35 units from the 39½-inch locus to the 65-inch locus. Therefore, the average change in photelometer is 1.4 units per inch of flow along the reaction zone when no prequench is used.

In the apparatus used to conduct the following two runs, a removable section containing the prequench inlet means 15 was reversible by removing the section and turning same 180° to change the introduction of the cooling gas from contrarotational to corotational. Because the inlet means was not centered in this removable section, there was a change in the locus of the inlet means from 39½-inches for the counterrotational introduction to 45 inches for the corotational introduction. Because of this 5½-inch difference in locus, it is determined that the expected change in photelometer over this distance wuld be 1.4 units per inch times 5½-inches, which equals a change in photelometer of 8 units, therefore making a photelometer reading of 56 at the 45 inch locus the expected photelometer reading, if the hot smoke was fully quenched at this location.

In the test runs, the following flow rates were used in a reactor having the listed dimensions:

For counterrotational and corotational prequench quench operations:

| | |
|---|---|
| Make Oil, pounds/hr., | 80 |
| BMCI (Bureau of Mines Correlation Index) | 122 |
| 50% Boiling Point, °F., | 800 |
| Axial Air, SCF/hr., | 220 |
| Tangential Air, SCF/hr., | 7,500 |
| Tangential Propane Fuel, SCF/hr., | 213 |
| Final Water Quench, pounds/hr., | 260 |

The make oil was added via nozzle located ¼ inch into the precombustion zone as measured from the upstream end of the precombustion zone. Axial air, to cool the nozzle and the oil pipe, was added in an annulus surrounding the oil pipe. The axial air outlet was flush with the upstream end of the precombustion zone. Surrounding the axial air annulus was a water cooling jacket for the oil and axial air injection means.

| Reactor Dimensions: | |
|---|---|
| Precombustion Zone: | |
| Length, inches | 4 |
| Diameter, inches, | 10⅝ |
| Diameter of Tangential Conduits, approximately, inches, | 4 |
| Venturi Section: | |
| Inlet Diameter, inches, | 3 |
| Outlet Diameter, inches, | 3 |
| Throat Diameter, inches, | 1.6 |
| Cylindrical Throat Length, inches, | ½ |
| Total Converging Angle, degrees, | 30 |
| Total Diverging Angle, degrees, | 16 |
| Length of Venturi Unit, inches, | 8.09 |
| First and Second Sections Downstream of Venturi: | |
| Diameter, inches, | 3 |
| Total Length, inches, | 40 |
| Third Section Downstream of Venturi: | |
| Diameter, inches, | 4 |
| Length, inches, | 24 |

The tangential conduits used for both contrarotational and corotational prequenches were, in cross-section, about 1 inch by 1½ inches, the longer axis being approximately one-half the diameter of the 3-inch diameter conduit, and the shorter axis being in the direction of the longitudinal axis of this 3-inch diameter reaction conduit.

The following data is provided to show the effectiveness of the counterrotational introduction of quench fluid within the reaction zone as compared to corotational introduction of quench fluid. Various amounts of ambient temperature nitrogen prequench were added as the prequench fluid at the conterrotational 39½-inch locus and the corotational 45 inch locus. Final quench with water was made in all nitrogen runs at the 65 inch locus.

| Counterrotational Run 1 | | |
|---|---|---|
| At 39½" | Final Photelometer* | % Effectiveness |
| H₂O as quench fluid | 47 (base) | 100 |
| N₂ as quench fluid, SCF/hr | | |
| 0 | 83 | 0 |
| 1000 | 55 | 77.8 |
| 2000 | 51 | 88.9 |
| 4000 | 48 | 97.2 |

| Corotational Run 2 | | |
|---|---|---|
| At 45" | Final Photelometer* | % Effectiveness |
| H₂O as quench fluid | 81 (base) | 100 |
| N₂ as quench fluid, SCF/hr | | |
| 0 | 89 | 0 |
| 1000 | 88 | 12.5 |
| 4000 | 82 | 87.5 |

*Final photelometer (ASTM D 1618-58T) is measured after the 65" locus.

Percent effectiveness of quench for each operation was determined by dividing the difference between the photelometer of the carbon black at zero quench and the photelometer at a specific nitrogen quantity quench by the difference between the photelometer at zero quench and the photelometer value at full water quench, the resultng value being multiplied by 100. (All quenches in run 1 were at 39½"; all quenches in run 2 were at 45".)

$$\% \text{ Effectiveness} = 100 \left[ \frac{P_{(O)} - P_{(N_2)}}{P_{(O)} - P_{(H_2O)}} \right]$$

where $P_{(O)}$ = Photelometer with Zero Quench;
$P_{(N_2)}$ = Photelometer with Specific N₂ Quench;
$P_{(H_2O)}$ = Photelometer with Full Water Quench.

The above data shows that in Run 1 in which the prequench fluid was introduced counterrotational to the vortex flow of the hot smoke was more effective reducing the photelometer of the carbon black than the corotational introduction of prequench fluid in Run 2.

Although two different carbon blacks were produced in Runs 1 and 2, as seen by base photelometers of 47 and 81, respectively, the percentage effectiveness "% Effectiveness" comparison hereinabove illustrates the advantage of the counterrotational quench as compared with corotational quench.

The additon in Run 1 of 2000 SCF/hr. of prequench nitrogen counterrotationally at the 39½ inch locus "froze" the photelometer and after final water quench to the 65 inch locus, the photelometer was 51. The percentage effectiveness calculates (see above) to be 88.9 percent. Run 2 used 4000 SCF/hr. of prequench nitrogen per hour and adding this double volume of prequench nitrogen (over Run 1) corotationally, instead of counterrotationally, the percentage effectiveness was 87.5 percent.

The above data illustrate that the counterrotational quench is more effective than corotational quench since substantially the same percentage effectiveness of quench was realized with counterrotatinal injection using one-half that amount of quench fluid used corotationally.

That is, in using counterrotational quench of the invention, less cooled smoke has to be recycled as prequench as compared with corotational introduction of prequench.

It is to be understood that while I have illustrated and described certain forms of my invention, it is not to be limited to the specific disclosed embodiments herein described and shown.

What is claimed and desired to be secured by Letters patent is:

1. An apparatus for producing carbon black including a reactor defining a precombustion chamber, reaction chamber and a quench chamber with said precombustion chamber being upstream of the reaction chamber and said reaction chamber being upstream of the quench chamber, said reactor having an outlet downstream of the quench chamber; said reactor having means defining a first inlet opening into at least one of said precombustion chamber and said reaction chamber and operable for introducing a make hydrocarbon into at least one of said precombustion and reaction chambers; wherein the improvement includes:

said reactor having means defining a second inlet opening generally tangentially, relative to the recombustion chamber, into the precombustion chamber and operable for introducing combustion gases into the precombustion chamber in one of a counterclockwise direction and a clockwise direction for vortex flow along the reaction chamber, said combustion gases when hot contact the make hydrocarbon to produce a smoke containing carbon black, said smoke also flowing in vortex flow along the reaction chamber;

said reactor having means defining at least one third inlet opening generally tangentially, relative to the quench chamber, into said quench chamber and operable for introducing quench fluid into the quench chamber in the other one of the counterclockwise direction and the clockwise direction for flow counterrotational to the vortex flow of smoke; and a source of quench fluid connected to said third inlet.

2. An apparatus as set forth in claim 1 including:
a venturi in said reaction chamber.

3. An appartus as set forth in claim 1 wherein:
there is a plurality of said third inlets.

4. An apparatus as set forth in claim 1 including:
a heat exchange means in flow communication with said reactor outlet and operable for cooling said smoke, said heat exchange means having an outlet; and first conduit means communicating between said third inlet and said heat exchange means outlet forming a flow path to the third inlet for cooled smoke from the heat exchange means wherein said cooled smoke is used as quench fluid.

5. An apparatus as set forth in claim 4 including:
a venturi in said reaction chamber.

6. An apparatus as set forth in claim 5 wherein:
there is a plurality of said third inlets.

7. An apparatus as set forth in claim 4 including:
second conduit means connected to said heat exchange means outlet for flow of smoke therethrough; and filter means connected to said second conduit means operable for receiving a portion of the smoke from the heat exchange means and operable to separate said portion of smoke into a gas phase and a carbon black phase.

8. An apparatus as set forth in claim 7 including:
a fourth inlet means opening into said second conduit means and operable for introducing a quench fluid into said second conduit means.

* * * * *

UNITED STATES PATENT AND TRADEMARK OFFICE
CERTIFICATE OF CORRECTION

PATENT NO. : 4,140,490

DATED : Feb. 20, 1979

INVENTOR(S) : Harold R. Hunt

It is certified that error appears in the above-identified patent and that said Letters Patent are hereby corrected as shown below:

Column 7, lines 1 and 2, after "chamber;" delete "said reactor having means defining"; line 7, delete "said reactor having means defining"; line 18, delete "said reactor having means defining at least one" and insert --- a --- before "third".

Column 8, line 3, delete "a"; line 26, delete "means".

*Signed and Sealed this*

*Tenth* Day of *July 1979*

[SEAL]

*Attest:*

*Attesting Officer*

LUTRELLE F. PARKER
*Acting Commissioner of Patents and Trademarks*